United States Patent
Tanaka et al.

[11] Patent Number: 6,081,057
[45] Date of Patent: Jun. 27, 2000

[54] SPINDEL MOTOR FOR A DISC DRIVE

[75] Inventors: Katsuhiko Tanaka; Ikunori Sakatani; Hiromitsu Muraki; Shoji Moguchi, all of Fujisawa, Japan

[73] Assignee: NSK Ltd., Tokyo, Japan

[21] Appl. No.: 09/349,905

[22] Filed: Jul. 8, 1999

Related U.S. Application Data

[63] Continuation of application No. 09/030,768, Feb. 26, 1998.

[51] Int. Cl.$^7$ ........................................... H02K 5/16
[52] U.S. Cl. ................................. 310/90; 310/156
[58] Field of Search ..................... 310/90, 67 R, 310/156, 49 R, 90.5

[56] References Cited

U.S. PATENT DOCUMENTS

| | | | |
|---|---|---|---|
| 4,570,093 | 2/1986 | Morii et al. | 310/46 |
| 4,701,651 | 10/1987 | Tanaka | 310/90 |
| 5,184,245 | 2/1993 | Murakami et al. | 359/196 |
| 5,328,272 | 7/1994 | Ainslie et al. | 384/112 |
| 5,333,079 | 7/1994 | Takegami et al. | 360/99.08 |
| 5,426,548 | 6/1995 | Fujii et al. | 360/98.08 |
| 5,488,523 | 1/1996 | Seaver et al. | 360/99.12 |
| 5,578,882 | 11/1996 | Dunfield et al. | 310/90.5 |
| 5,587,617 | 12/1996 | Dunfield et al. | 310/90.5 |
| 5,604,390 | 2/1997 | Ackermann | 310/156 |
| 5,633,545 | 5/1997 | Albrecht et al. | 310/67 R |
| 5,683,183 | 11/1997 | Tanaka et al. | 384/100 |
| 5,834,866 | 11/1998 | Fujitani et al. | 310/49 R |

FOREIGN PATENT DOCUMENTS 407054842  2/1995  Japan.

*Primary Examiner*—Nestor Ramirez
*Assistant Examiner*—Joseph Waks
*Attorney, Agent, or Firm*—Vorys, Sater, Seymour and Peas LLP

[57] ABSTRACT

In a spindle motor for a disc drive in which a rotatable body having a disc mounted thereon is rotatively driven by a motor, the rotatable body is rotatably supported on a support member through a ball bearing and a hydrodynamic fluid bearing, and a preload equal to or greater than an axial load of 1N is imparted to the ball bearing.

26 Claims, 6 Drawing Sheets

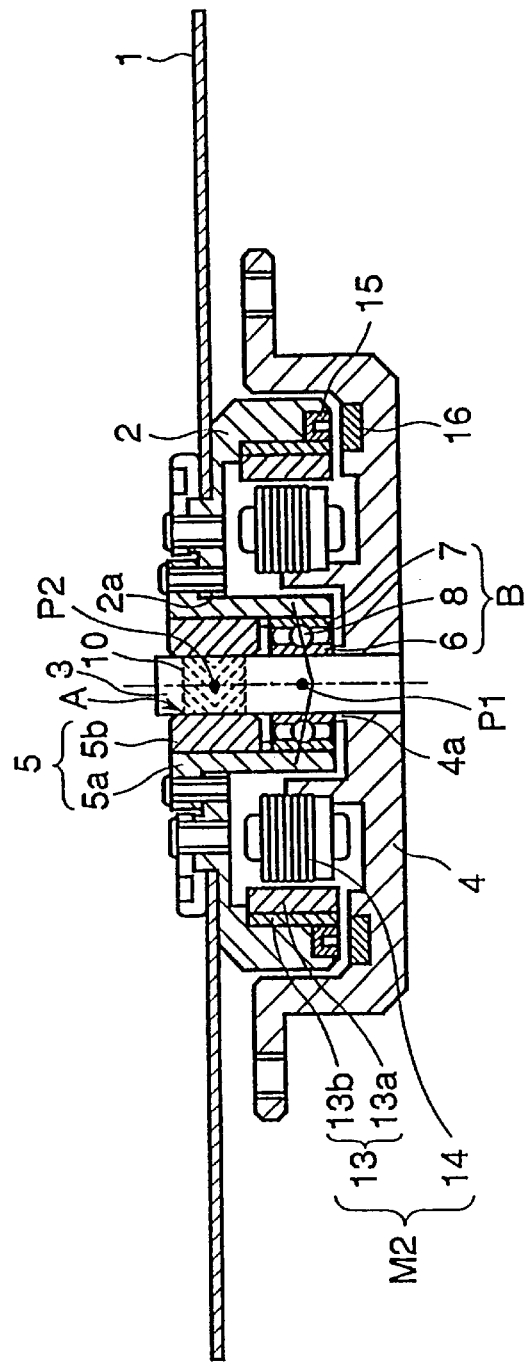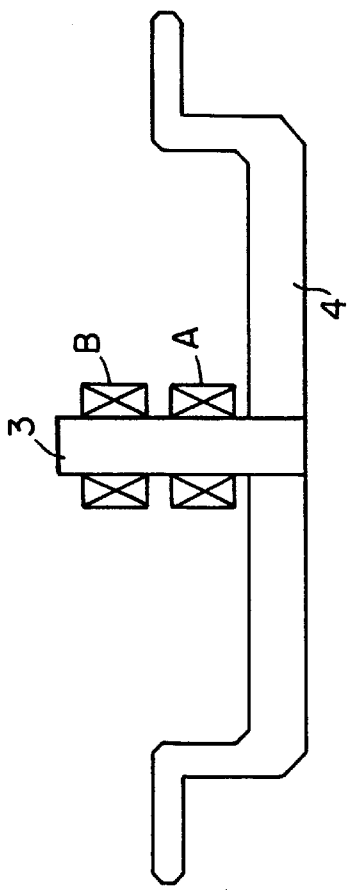

SPINDEL MOTOR FOR A DISC DRIVE

CROSS-REFERENCE TO CO-PENDING APPLICATIONS

This application is a continuation of application Ser. No. 09/030,768 filed Feb. 26, 1998.

BACKGROUND OF THE INVENTION

1. Field of the Invention

This invention relates to a spindle motor for a disc drive used in an information, image or sound instrument such as a magnetic disc, a magneto-optical disc or an optical disc, or for other precision rotation instruments and the like.

2. Related Background Art

A spindle motor for a disc drive according to the prior art is of such structure as shown in FIG. 6 of the accompanying drawings.

In the arrangement of FIG. 6, hub 51 carrying a disc 50 thereon is rotatably supported on a shaft member 54 through two ball bearings 52 and 53. A rotor 56 fixed to the hub 51 is opposed to a stator 57 fixed to a housing 55 supporting the shaft member 54, thus constituting a motor M, and the hub 51 and disc 50 are rotatively driven by the motor M.

Recent advances in magnetic disc drive apparatuses have led to the use of thinner discs and higher recording density. Consequently, a small amplitude and small vibration of the element of non-repetitive runout (vibration which does not synchronize with rotation) of the disc are required of spindle motors used therein.

Accordingly, small vibration of the element of non-repetitive runout is required of the ball bearings incorporated in the spindle motor as shown in FIG. 6. The ball bearings, however, have ball passage vibration and vibration attributable to the errors of the shapes of the parts of the bearings, and even if the accuracy of working is improved, it is difficult to make the vibration of the element of non-repetitive runout less than a predetermined value. Also, when two ball bearings are used, there is the disadvantage that the vibration of the element of non-repetitive runout becomes great due to misalignment attributable to the error of the assembly of the two ball bearings.

On the other hand, there has been studied a spindle motor using, instead of ball bearings, hydrodynamic fluid bearings small in the vibration of the element of non-repetitive runout in both of a radial bearing and a thrust bearing. But the thrust hydrodynamic fluid bearing suffers from the disadvantage that the starting torque is great because the bearing surfaces are in surface contact with each other when the motor is stationary. Also, when the spindle motor is used in its vertically placed state, there is the problem that the starting torque becomes great and a great axial load is applied to the thrust hydrodynamic fluid bearing, so that by the repetition of starting and stoppage, the surface of the thrust bearing is liable to be damaged or worn.

Also, with the downsizing and lighter weight of the apparatus, the use in portable instruments has become widespread. In such applications, small power consumption and small noise are required of the spindle motor.

SUMMARY OF THE INVENTION

In view of the above-noted problems, the present invention has as a principal object to provide a spindle motor for a disc drive which exhibits small vibration of the element of non-repetitive runout of a disc carried thereon in the radial direction thereof, and which exhibits small starting torque and excellent starting-stoppage durability, as well as electric power consumption and noise.

To solve the above-noted problems, according to the present invention, in a spindle motor for a disc drive in which a rotatable body having a disc mounted thereon is rotatively driven by a motor, the rotatable body is rotatably supported on a support member through a ball bearing and a hydrodynamic fluid bearing, and a preload equal to or greater than an axial load of 1N (1 Newton) is imparted to the ball bearing.

BRIEF DESCRIPTION OF THE DRAWINGS

FIG. 4 shows a spindle motor for a disc drive according to a third embodiment of the present invention.

FIG. 4A is a diagrammatic view showing a bearing arrangement for a modified embodiment.

DESCRIPTION OF THE PREFERRED EMBODIMENTS

Figure 1:
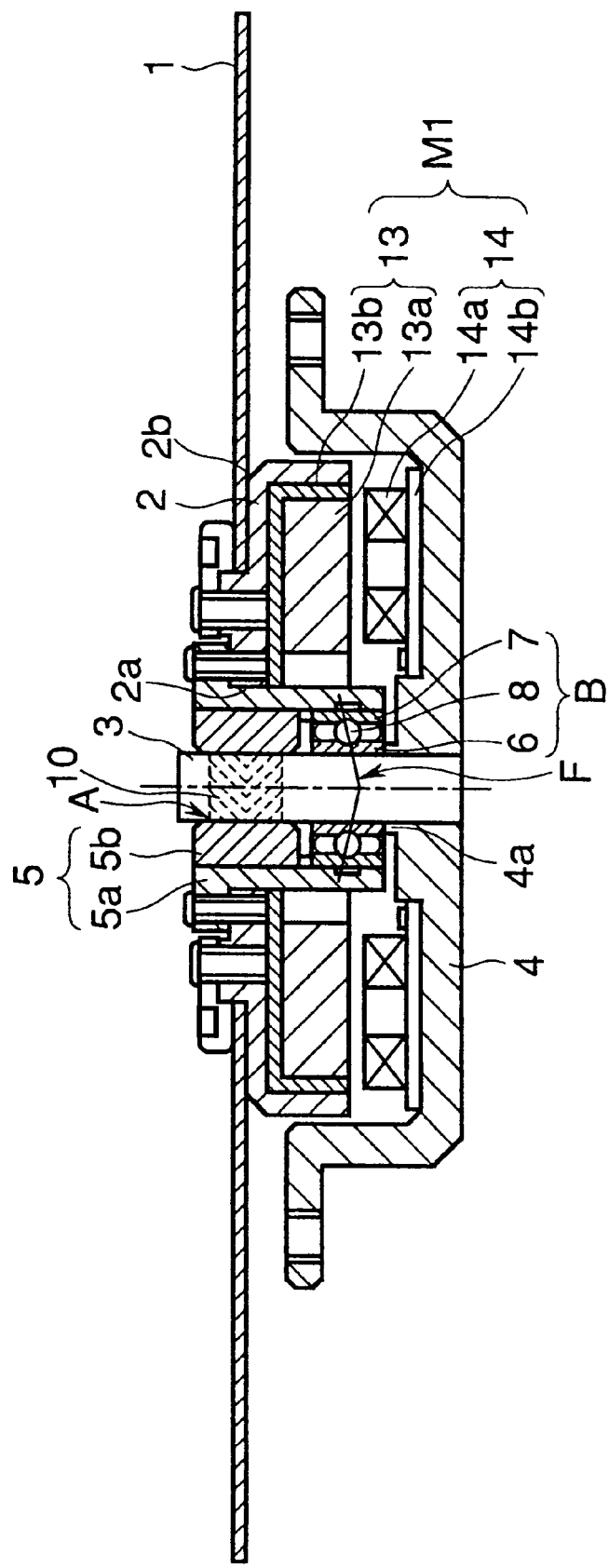
FIG. 1 shows a spindle motor according to a first embodiment of the present invention.

FIG. 1 shows a first embodiment of the present invention. A sleeve 5 is fixed to the inner peripheral surface of a hub 2 carrying a disc 1 thereon, and the sleeve 5 and the hub 2 together constitute a rotatable body. The rotatable body is rotatably supported on a shaft member 3 through a hydrodynamic fluid bearing A which is a radial hydrodynamic fluid bearing and a ball bearing B axially separate from the hydrodynamic fluid bearing A. The shaft member 3 is fixed to a housing 4 and cooperates with the housing 4 to constitute a support member.

In more detail, one end portion of the shaft member 3 is fixed to the housing 4, and the ball bearing B is interposed between the lower portion of the sleeve 5, inserted in an insertion hole 2a formed in the hub 2, and the outer peripheral surface of the shaft member 3. The hydrodynamic fluid bearing A is formed by the inner peripheral surface of the upper portion of the sleeve 5 and the outer peripheral surface of the shaft member 3. The sleeve 5 is secured to the insertion hole 2a in the hub 2 by press-fitting or an adhesive agent. The sleeve 5 and the hub 2 may be integral with each other.

The sleeve 5 is constituted by an outer cylinder 5a formed into a cylindrical shape, and an inner cylinder 5b formed into a cylindrical shape having such an outer diameter that it can be pressed into the outer cylinder 5a.

The ball bearing B is a single-row deep groove ball bearing and has its inner ring 6 fixed coaxially to the shaft member 3 and has its outer ring 7 fixed to the outer cylinder 5a. Balls 8, which are a plurality of rolling elements, are interposed between the inner ring 6 and the outer ring 7.

Also, the inner peripheral surface of the inner ring 6 of the ball bearing B and the shaft member 3 are secured to each other by an adhesive agent or press-fitting or the like. Of course, they may be disposed by loose fit. In the case of loose fit, the inner ring 6 is axially supported in contact with an annular portion 4a slightly upwardly protruding on the upper surface of the housing 4.

Likewise, the outer ring 7 may be secured to the outer cylinder 5a by an adhesive agent or press-fitting or the like, or it may be secured by loose fit.

The value of the clearance in the case of loose fit may preferably be 10 μm or less in diameter from the viewpoint of vibration accuracy. When loose fit is adopted, assembly can be done simply by inserting the ball bearing B and therefore, assembly becomes easy. Particularly, when the inner ring 6 is used in loose fit, assembly is completed simply by inserting the hub 2 having the pre-incorporated outer cylinder 5a mounted thereon into the shaft member 3. Therefore, the steps of assembling can be reduced and a lower cost can be achieved.

Also, when the outer ring 7 is clearance-fitted to the outer cylinder 5a, deformation of the outer ring 7 which may tend to occur during press-fitting or securing can be prevented, and the vibration accuracy of the ball bearing B can be maintained.

Also, the hydrodynamic fluid bearing A is constructed with a cylindrical radial bearing surface formed on the outer peripheral surface of the shaft member 3 and a radial bearing surface formed on the inner peripheral surface of the inner cylinder 5b of the sleeve 5 diametrally opposed to each other with a predetermined bearing gap therebetween and with the bearing gap filled with lubricating fluid.

The axially opposite end portions of a radial bearing surface provided on the inner cylinder 5b of the sleeve 5 are formed with tapered surfaces. That is, the radial bearing surface of the inner cylinder 5b comprises two taper surfaces provided on the axially opposite end portions, and a cylindrical bearing surface body formed between the two tapered surfaces.

Each of the tapered surfaces holds the lubricating fluid by surface tension, and is inclined so as to be separate from the radial bearing surface provided on the shaft member 3 as it advances along outer surface of the shaft (in the axial direction).

The angle of inclination of each tapered surface from the axis may preferably be selected within the range of the order of 2° to 40°. If the angle of inclination of the tapered surfaces is smaller than 2°, the lubricating fluid which can be held by the tapered surfaces may become insufficient, and if the angle of inclination of the tapered surfaces is larger than 40°, the lubricating fluid may be scattered by the centrifugal force during the rotation of the hub 2. When the number of revolutions of the hub 2 is higher than 3600 rpm, the angle of inclination of the tapered surfaces can be designed to be 30° or less to thereby prevent the scattering of the lubricating fluid, thus providing a bearing device of higher reliability.

Also, the radial bearing surface of the shaft member 3 is formed with a groove 10 for producing dynamic pressure, comprising a so-called herringbone-like or spiral groove. Of course, the groove for producing dynamic pressure may be formed in the bearing surface body of the sleeve 5 (the inner peripheral surface of inner cylinder 5b), or respective grooves for producing dynamic pressure may be formed in the bearing surfaces of each of the shaft member 3 and the sleeve 5.

As the lubricating fluid filling the bearing gap, use is made, for example, of oil, grease, magnetic fluid or the like.

By the aforedescribed construction, the rotatable body provided with the hub 2 carrying the disc 1 thereon and the sleeve 5 is rotatably supported on the shaft member 3 through the ball bearing B and the hydrodynamic fluid bearing A.

A motor M1 is inserted in a circular ring shape concentrically with the ball bearing B at the outer peripheral side position in the diametral direction of the ball bearing B axially between the hub 2 and the housing 4.

Specifically, a circular ring-like stator 14 is fixed to that portion of the housing 4 which is adjacent to the hub 2, while on the hub 2 side of the stator 14, a rotor 13 is disposed coaxially with the stator 14 with a predetermined gap therebetween, and the rotor 13 is fixed to the hub 2. The rotor 13 is constituted by a magnet 13a provided on a side opposed to the stator 14, and a rotor yoke 13b fixed to the hub side of the magnet 13a. The rotor yoke 13b is for reducing a magnetic flux leakage to the outside. The stator 14 is constituted by a stator member 14a provided on a side opposed to the rotor 13 and a stator yoke 14b fixed to the housing side of the stator member 14a.

The present embodiment is of such structure that the hub rotates about a fixed shaft. An opposed type motor is used as the motor, and the axial load by the magnetic attraction between the rotor 13 and the stator 14 is used as the preload of the ball bearing B. The magnitude of the axial load is set so as to be 1N or greater with the magnetic attraction of the motor and the gravity force on the rotatable body totalled.

The reason why the preload of the ball bearing is set so as to be 1N or larger is that if the preload is smaller than this value, the axial rigidity of the ball bearing will become deficient and axial vibration will become great, and the sound around the shaft member 3 will become great and the noise of the entire spindle motor will become great. If the preload of the ball bearing is 2N or greater, the noise of the entire spindle motor will be prevented and this is preferable.

If the magnetic attraction is set so as to be greater than the gravity force on the rotatable body, the rotatable body will not slip off even if it is carried upside down, and it will not be necessary to install anti-slip means discretely and therefore, the number of parts can be decreased.

In the present embodiment, the ball bearing and the hydrodynamic fluid bearing are used. Therefore, the vibration of the element of non-repetitive runout can be made small relative to that associated with the misalignment due to assembly error in a case where two ball bearings are used. Further, as compared with a case when two radial hydrodynamic fluid bearings are used, the surface contact between the bearing and the bearing surface is small and therefore, the starting torque can be made small.

Also, because the axial position of the disc 1 is substantially the same as that of the radial hydrodynamic fluid bearing A which is substantially free of the vibration of the element of non-repetitive runout, the vibration of the element of non-repetitive runout of the disc 1 in the radial direction thereof can be made small.

Figure 2:
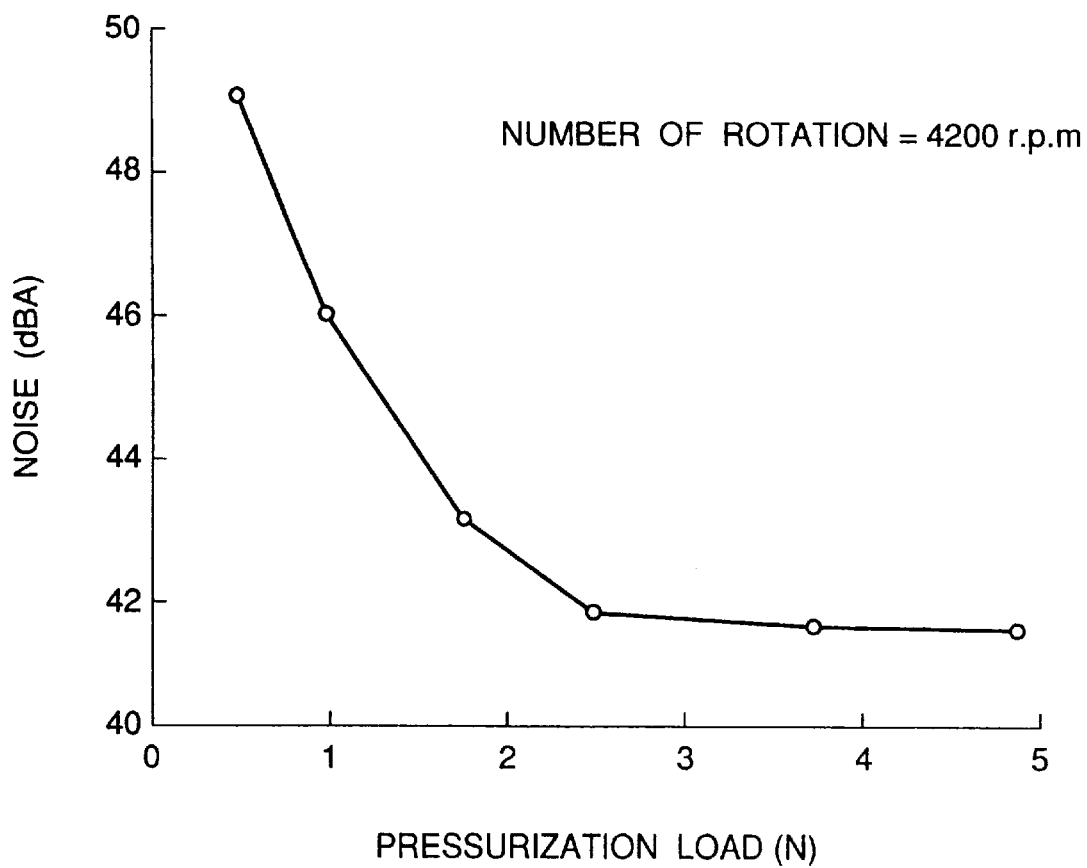
FIG. 2 is a graph showing the result of an experiment on the relation between the preload of a ball bearing according to the present invention and noise.

FIG. 2 shows an experimentally obtained relationship between the preload (unit N) applied to the single-row deep groove ball bearing (call number 684, the outer diameter 9 mm, the inner diameter 4 mm) and the noise (unit dBA) at a number of revolutions 4,200 rpm of the rotatable member. As can be seen from FIG. 2, the noise is small for a preload of 1N or greater, and the noise is smaller and is at a substantially constant value for a preload of 2N or greater. This is because when the preload is smaller than 1N, the axial rigidity of the ball bearing becomes deficient and axial vibration becomes great, and the sound around the shaft member 3 becomes great and the noise of the entire spindle motor becomes great. It is preferable from the viewpoint of the life of the ball bearing that the preload of the ball bearing be less than 100N.

Figure 3:
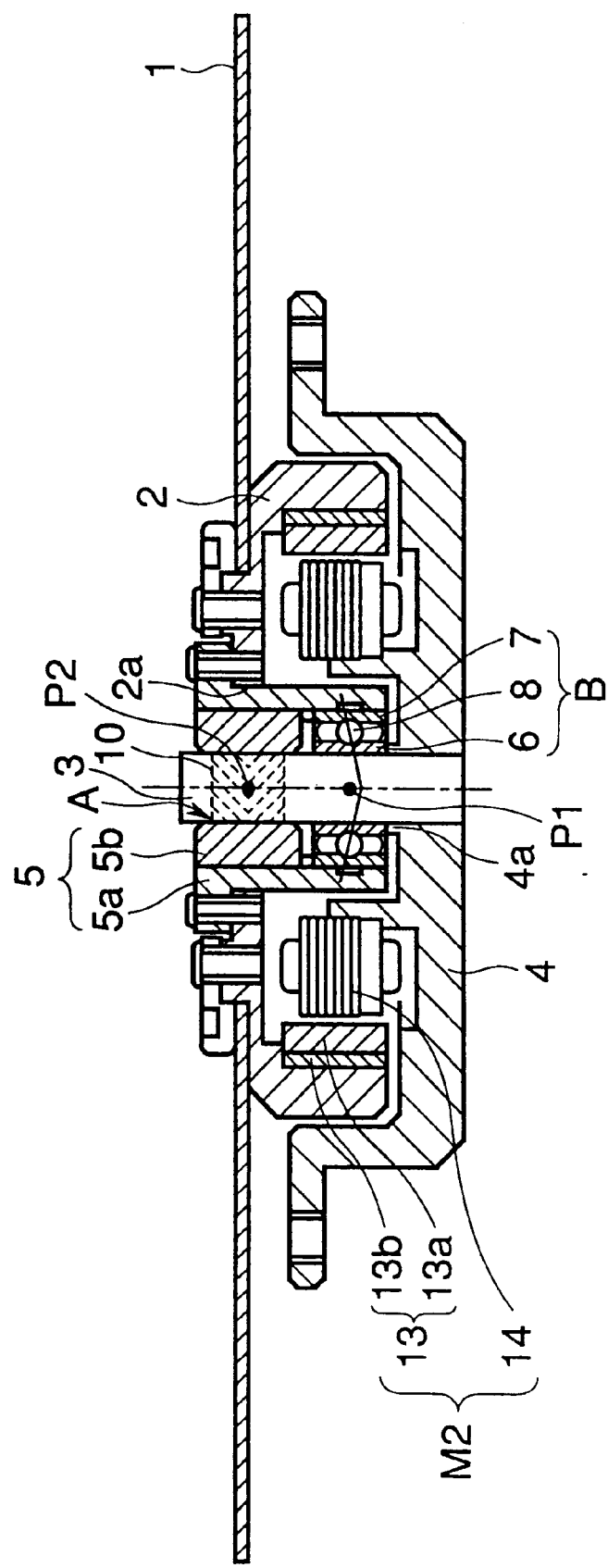
FIG. 3 shows a spindle motor for a disc drive according to a second embodiment of the present invention.

FIG. 3 shows a second embodiment of the present invention. In this embodiment, a motor M2 in which the rotor 13 and the stator 14 are radially opposed to each other is used instead of an axially opposed type motor. The axial center of the rotor 13 fixed to the hub 2 is axially (upwardly as viewed in FIG. 3) spaced apart toward the hydrodynamic fluid bearing side from the axial center of the stator 14 fixed to the housing 4, whereby the stator 14 axially attracts the rotor 13 to impart a preload to the ball bearing of 1N or greater, and preferably 2N or greater, with this attraction and the gravity force of the rotatable body provided with the rotor 13 totalled.

Both of the axial centers of the rotor 13 and the stator 14 lie between the axial center P2 of the hydrodynamic fluid bearing A and the axial center P1 of the ball bearing B.

Figure 5:
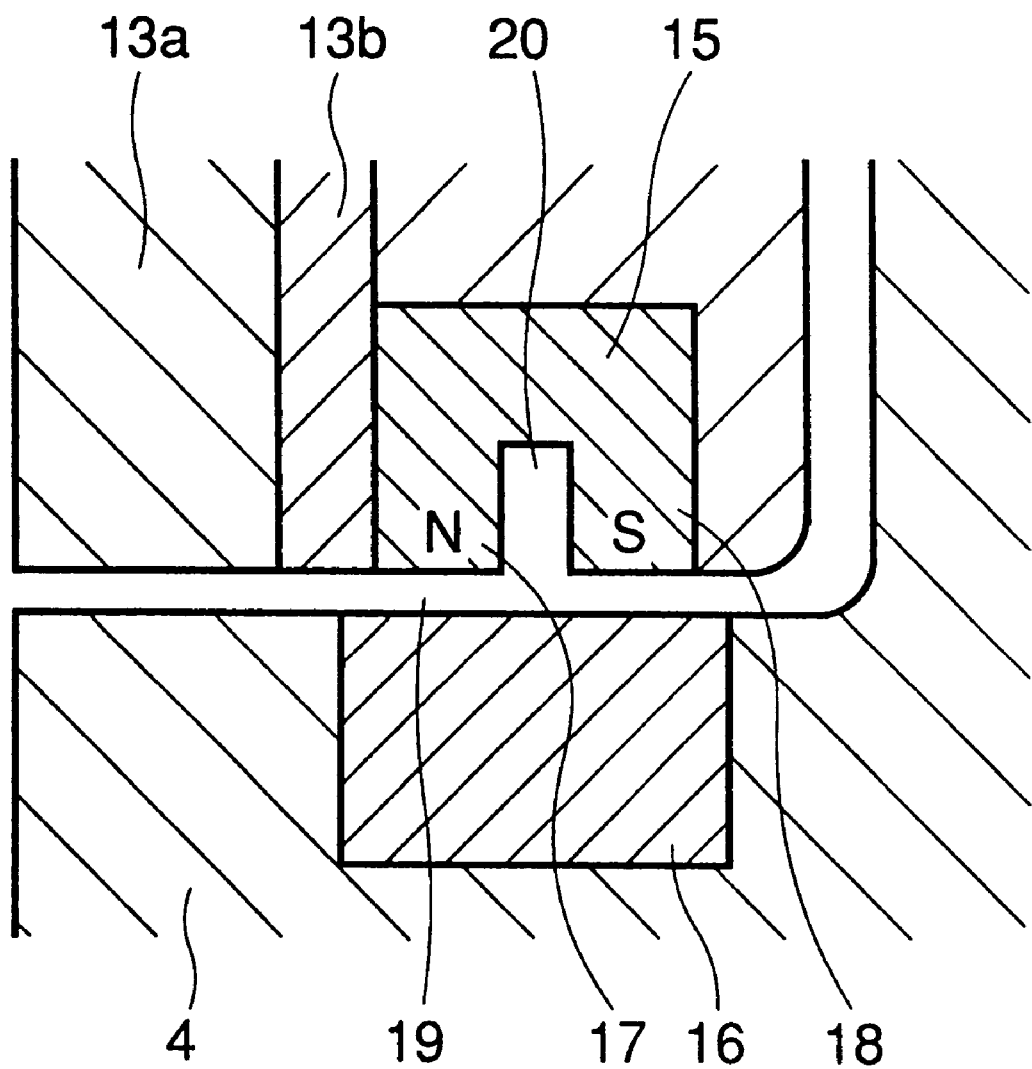
FIG. 5 is an enlarged view showing a magnet for attracting and a ferromagnetic body for being attracted according to the present invention.
Figure 6:
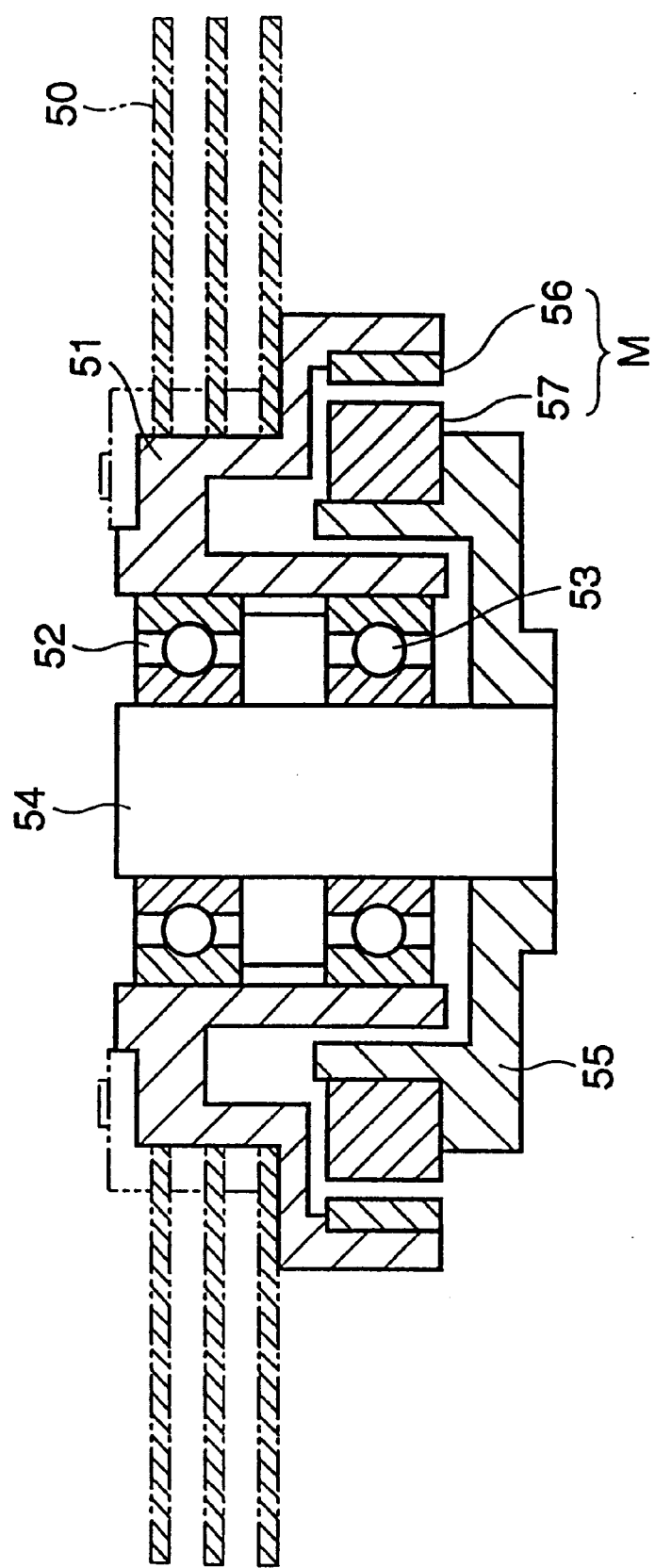
FIG. 6 is a view for illustrating a spindle motor for a disc drive according to the prior art.

FIG. 4 shows a third embodiment of the present invention. In this embodiment, as in FIG. 3, the radially opposed motor M2 is used and the attraction in the axial direction is given by a discretely installed magnet 15 for attracting. In this embodiment, the magnet 15 for attracting is installed on the hub 2 and a ferromagnetic body 16 for being attracted is installed in the housing 4. Alternatively, the ferromagnetic body 16 for being attracted may be installed on the hub 2 and the magnet 15 may be installed in the housing 4. Also, both of them may be magnets. As regards that surface of the magnet 15 which is opposed to the ferromagnetic body 16 for being attracted, it is preferable that the inner peripheral portion 17 thereof and the outer peripheral portion 18 thereof be different poles, as shown in FIG. 5. In this case, the inner peripheral portion of the end surface of a ring-like magnet is magnetized to N pole, the outer peripheral portion of the ring-like end surface thereof is magnetized to S pole, and a circumferential groove 20 wider in its width in the radial direction than the axial gap 19 between the ferromagnetic body 16 for being attracted and the magnet 15 for attracting is formed between the outer peripheral portion 18 and the inner peripheral portion 17 of the end surface of the ring-like magnet. Even if the magnet 15 or the ferromagnetic body 16 is rotated, the magnetic flux of the ferromagnetic body 16 does not change and therefore, no eddy current is produced in the ferromagnetic body 16. For this reason, any loss due to the eddy current between the magnet 15 and the ferromagnetic body 16 during the rotation thereof can be eliminated and therefore, the rotational torque of the entire spindle motor is not caused to rise. (If there is adopted a construction in which the magnetic flux changes in the ferromagnetic body, an eddy current will be produced in the ferromagnetic body and this will result in a loss. Therefore, increased driving torque corresponding to the loss by the eddy current will become necessary when the spindle motor is rotated.) When there is a surplus of the attraction of the magnet 15, the circumferential groove 20 may be eliminated and the cost may be reduced.

The positional relationship between the ball bearing and the radial hydrodynamic fluid bearing may be such that unlike this embodiment, the ball bearing overlies the hydrodynamic fluid bearing as shown diagrammatically in FIG. 4A. Also, the disc 1 can be mounted on the shaft member 3 to thereby make the shaft member 3 into a rotatable body, and the hub 2 and the sleeve 5 can be made into a support member and the rotatable body can be rotatively driven by a motor.

It is preferable that a ball bearing having a number of rolling elements such as twelve or eighteen rolling elements (balls) and having the chief low frequency mountain component of the error of the shapes of the raceway surfaces of the inner ring and the outer ring as a divisor be used as the deep groove ball bearing used. If the number of the rolling elements is twelve or eighteen, the number of the rolling elements becomes a multiple of the number of the mountains of the low frequency component of the error of the shapes of the raceway surfaces of the inner ring and the outer ring, and the vibration of the element of non-repetitive runout of the ball bearing is not affected by the low frequency component up to ten mountains which is the chief component of the error of the shapes of the raceway surfaces of the inner ring and outer ring of the ball bearing. Thus, the vibration of the element of non-repetitive runout of the spindle motor can be made further smaller.

The ground for this will now be described.

At present, it is known that with the error of the shapes and the number of the rolling elements of the raceway surfaces of the inner ring and outer ring of an anti-friction bearing as parameters, the motion of the axis resulting from the angle of rotation of the bearing can be theoretically calculated from the balance of the internal force. (Kyosuke Ono et al., THEORETICAL ANALYSIS OF SHAFT VIBRATION SUPPORTED BY A BALL BEARING WITH SMALL SINUSOIDAL WAVINESS, IEEE TRANSACTION ON MAGNETICS, Vol. 132, No. 3, MAY 1996)

When an analysis program was developed from this known expression of theoretical calculation and the mountain components (2 to 10 mountains) of the error of the shape of the outer ring and the number of rolling elements (7 to 20) were changed and the maximum value of the non-synchronous rotation component of vibration (calculated for 50 rounds at 256 points per round, the total amplitude of the error of the shape 2 $\mu$m, and without the error of the shape and the dimensional difference of the rolling elements) was investigated results as shown in Table 1 below were obtained. The values of the results of calculation which are 0.01 $\mu$m or less are shown as 0. Also, when an error of shape was given to the inner ring, the result is similar to Table 1. Also, the error of shape given to the raceway surface of the outer ring was an ideal sine wave represented by A·sin B$\theta$ (A being the amplitude of the error of shape, B being the number of error mountains, and $\theta$ being the angle).

TABLE 1

| Number of Rolling Members | Number of the Mountains of the Outer Ring Shape Error | | | | | | | | |
|---|---|---|---|---|---|---|---|---|---|
| | 2 | 3 | 4 | 5 | 6 | 7 | 8 | 9 | 10 |
| 7 | 0.007 | 0.129 | 0.13 | 0.007 | 2.001 | 0 | 2.003 | 0.007 | 0.132 |
| 8 | 0 | 0.006 | 0 | 0.006 | 0 | 1.999 | 0 | 1.999 | 0 |
| 9 | 0.001 | 0 | 0.13 | 0.13 | 0 | 0.001 | 2.005 | 0 | 2.006 |
| 10 | 0 | 0.006 | 0 | 0 | 0 | 0.006 | 0 | 2.008 | 0 |
| 11 | 0 | 0.001 | 0.006 | 0.129 | 0.129 | 0.006 | 0.001 | 0 | 2.003 |
| 12 | 0 | 0 | 0 | 0 | 0 | 0 | 0 | 0 | 0 |
| 13 | 0 | 0.001 | 0.006 | 0 | 0.13 | 0.13 | 0 | 0.006 | 0.001 |
| 14 | 0 | 0 | 0 | 0.006 | 0 | 0 | 0 | 0.006 | 0 |
| 15 | 0 | 0 | 0.001 | 0 | 0 | 0.13 | 0.129 | 0 | 0 |
| 16 | 0 | 0 | 0 | 0.006 | 0 | 0 | 0 | 0 | 0 |
| 17 | 0 | 0 | 0.001 | 0 | 0.006 | 0 | 0.131 | 0.131 | 0 |
| 18 | 0 | 0 | 0 | 0 | 0 | 0 | 0 | 0 | 0 |
| 19 | 0 | 0 | 0 | 0.001 | 0.006 | 0 | 0 | 0.131 | 0.131 |
| 20 | 0 | 0 | 0 | 0 | 0 | 0.006 | 0 | 0 | 0 |

(Note) All the units of the calculated values are $\mu$m.

From Table 1 above, it can be seen that regarding the relation between the number of the error mountains of the shapes of the raceway surfaces of the inner and outer rings and the number of rolling elements, when the number of rolling elements is a multiple of the number of the error mountains of the shapes (that is, when the number of rolling elements is set so as to have as a divisor the number of the error mountains of the shapes had by the low frequency mountain components of the shapes of the raceway surfaces of the inner and outer rings incorporated), the element of non-repetitive runout of vibration does not appear. That is, it can be seen that if the number of rolling elements is set to a number often having as a divisor the number of the error mountains of the shapes had by the number of the low frequency mountains of the errors of the shapes of the raceway surfaces of the outer ring and inner ring, the vibration of the element of non-repetitive runout of an anti-friction bearing using the outer ring and inner ring can be reduced. The vibration of the element of non-repetitive runout of the entire spindle motor using such a ball bearing can thus also be reduced.

The main low frequency mountain component of the errors of the shapes of the raceway surface is the component of the error mountains of the shape up to 2 to 10 mountains. That is, it is preferable to set the number of rolling elements to a number equal to the number often having the integers up to 2 to 10 mountains as a divisor.

When the number of rolling elements is twelve, divisors up to 2 to 10 mountains are four, i.e., 2, 3, 4 and 6, and when the number of rolling elements is eighteen, divisors are four, i.e., 2, 3, 4 and 9. The number of rolling elements may preferably be twelve or eighteen, but sixteen having three of divisors up to 2 to 10 may be the number of rolling elements. When the number of rolling elements is sixteen, it will be seen from Table 1 that except for 5 mountains, the value of the maximum element of non-repetitive runout is 0 and the vibration of the element of non-repetitive runout can be effectively made small. From this it will be seen that a similar effect can also be obtained in a ball bearing having a number of rolling elements (24, 36, 48, etc.) equal to a number having three or more of divisors up to 2 to 10.

According to the present invention, the rotatable member is supported by the ball bearing and the hydrodynamic fluid bearing to thereby prevent the vibration of the element of non-repetitive runout attributable to the assembly error as in a case where two ball bearings are adopted. Also, all of the axial load is supported by the ball bearing and therefore, a thrust hydrodynamic fluid bearing becomes unnecessary and the problem of the wear of the thrust hydrodynamic fluid bearing during starting and stoppage can be eliminated. Also, since the ball bearing is small in starting torque, the electric power consumption of the entire spindle motor can be made small as compared with a spindle motor in which all bearings are hydrodynamic fluid bearings. Also, since the preload to the ball bearing is 1N or greater, the axial rigidity of the ball bearing becomes high and therefore, axial vibration can be made small and the noise of the entire spindle motor for a disc drive can be made small.

What is claimed is:

1. A spindle motor for a disc drive, comprising:
    a fixed support;
    a rotatable body rotatably supported on said fixed support and on which a disc is to be mounted;
    an annular ball bearing mounted between said fixed support and said rotatable body;
    a hydrodynamic fluid bearing mounted between said fixed support and said rotatable body in a juxtaposed relationship with said ball bearing;
    a motor, including a stator and a rotor, for rotatively driving said rotatable body; and
    a preload imparting arrangement constructed to impart an axial preload to said ball bearing, said preload imparting arrangement including first and second magnetic members discrete from said rotor and stator of said motor, said first magnetic member being fixed to said rotatable body and said second magnetic member being fixed to said fixed support and magnetically attracted to said first magnetic member, a magnetic attraction force between said first and second magnetic members acting to axially preload said ball bearing.

2. A spindle motor for a disc drive according to claim 1, wherein said rotor is mounted on said rotatable body, said stator is mounted on said fixed support, and said rotor and said stator are opposed to each other radially of said fixed support and generate a magnetic attraction force therebetween that contributes to the axial preload of said ball bearing.

3. A spindle motor for a disc drive according to claim 1, wherein said rotor is mounted on said rotatable body, said stator is mounted on said fixed support, and said rotor and said stator are disposed relative to each other so as to generate a magnetic attractive force therebetween that contributes to the axial preload of said ball bearing.

4. A spindle motor for a disc drive according to claim 3, wherein axial centers of said rotor and said stator are positioned between axial centers of said ball bearing and said hydrodynamic fluid bearing.

5. A spindle motor for a disc drive according to claim 1, wherein said fixed support comprises a fixed shaft fixed to a housing, and said ball bearing is positioned farther from said housing than said hydrodynamic fluid bearing in an axial direction.

6. A spindle motor for a disc drive according to claim 1, wherein said fixed support comprises a fixed shaft fixed to a housing, and said ball bearing is positioned nearer to said housing than said hydrodynamic fluid bearing in an axial direction.

7. A spindle motor for a disc drive according to claim 1, wherein the axial load imparted to said ball bearing by said preload imparting arrangement is at least 1N.

8. A spindle motor for a disc drive according to claim 1, wherein said ball bearing is a deep groove ball bearing in which a number of rolling elements is twelve, sixteen or eighteen.

9. A spindle motor for a disc drive according to claim 1, wherein said first magnetic member is a permanent magnet and said second magnetic member is a ferromagnetic material.

10. A spindle motor for a disc drive according to claim 1, wherein said first magnetic member is a ferromagnetic material and said second magnetic member is a permanent magnet.

11. A spindle motor for a disc drive according to claim 1, wherein each of said first and second magnetic members is a magnet.

12. A spindle motor for a disc drive according to claim 1, wherein said preloading arrangement imparts an axial preload of at least 2N to said ball bearing.

13. A spindle motor for a disc drive according to claim 1, wherein one of said first and second magnetic members is a permanent magnet and the other of said first and second magnetic members is a ferromagnetic body, and wherein said permanent magnet is constructed and disposed such that substantially no change in magnetic flux occurs in said ferromagnetic body upon relative rotation between said permanent magnet and said ferromagnetic body.

14. A spindle motor for a disc drive, comprising:

a fixed support;

a rotatable body rotatably supported on said fixed support and on which a disc is to be mounted;

an annular ball bearing disposed between said fixed support and said rotatable body;

a hydrodynamic fluid bearing disposed between said fixed member and said rotatable body in a juxtaposed relationship with said ball bearing;

a motor for rotatively driving said rotatable body; and a preload imparting arrangement constructed to impart an axial preload to said ball bearing, said preload imparting arrangement including a first magnetic member fixed to said rotatable body and a second magnetic member fixed to said fixed support and magnetically attracted to said first magnetic member, a magnetic attraction force between said first and second magnetic members acting to axially preload said ball bearing;

wherein at least one of said first and second magnetic members is a permanent magnet.

15. A spindle motor for a disc drive according to claim 14, wherein said preload imparting arrangement includes a rotor mounted on said rotatable body, and a stator mounted on said fixed support, wherein said rotor and said stator are opposed to each other radially of said fixed support and generate a magnetic attractive force therebetween that contributes to the axial preload of said ball bearing.

16. A spindle motor for a disc drive according to claim 14, wherein said preload imparting arrangement includes a rotor mounted on said rotatable body, and a stator mounted on said fixed support, wherein said rotor and said stator are disposed relative to each other so as to generate a magnetic attractive force therebetween that contributes to the axial preload of said ball bearing.

17. A spindle motor for a disc drive according to claim 16, wherein axial centers of said rotor and said stator are positioned between axial centers said ball bearing and said hydrodynamic fluid bearing.

18. A spindle motor for a disc drive according to claim 14, wherein said fixed support comprises a fixed shaft fixed to a housing, and said ball bearing is positioned farther from said housing than said hydrodynamic fluid bearing an axial direction.

19. A spindle motor for a disc drive according to claim 14, wherein said fixed support comprises a fixed shaft fixed to a housing, and said ball bearing is positioned nearer to said housing than said hydrodynamic fluid bearing in an axial direction.

20. A spindle motor for a disc drive according to claim 14, wherein an axial load imparted to said ball bearing by said preload imparting arrangement is at least 1N.

21. A spindle motor for a disc drive according to claim 14, wherein said ball bearing is a deep groove ball bearing in which a number of rolling elements is twelve, sixteen or eighteen.

22. A spindle motor for a disc drive according to claim 14, wherein said first magnetic member is a permanent magnet and said second magnetic member is a ferromagnetic material.

23. A spindle motor for a disc drive according to claim 14, wherein said first magnetic member is a ferromagnetic material and said second magnetic member is a permanent magnet.

24. A spindle motor for a disc drive according to claim 14, wherein each of said first and second magnetic members is a permanent magnet.

25. A spindle motor for a disc drive according to claim 14, wherein said preloading arrangement imparts an axial preload of at least 2N to said ball bearing.

26. A spindle motor for a disc drive according to claim 14, wherein one of said first and second magnetic members is a permanent magnet and the other of said first and second magnetic members is a ferromagnetic body, and wherein said permanent magnet is constructed and disposed such that substantially no change in magnetic flux occurs in said ferromagnetic body upon relative rotation between said permanent magnet and said ferromagnetic body.

* * * * *

UNITED STATES PATENT AND TRADEMARK OFFICE
CERTIFICATE OF CORRECTION

PATENT NO. : 6,081,057
DATED : July 27, 2000
INVENTOR(S) : Katsuhiko TANAKA et al.

It is certified that error appears in the above-identified patent and that said Letters Patent are hereby corrected as shown below:

On the title page:

In item [54]:

"SPINDEL" should read --SPINDLE--;

In item [75]:

"Shoji Moguchi" should read --Shoji Noguchi--;

After item [63], insert the following:

--[30] Foreign Application Priority Data

Feb. 27, 1997   [JP] . . . . . . . . . . . . . . . . 9-043479--.

Signed and Sealed this

Seventeenth Day of April, 2001

Attest:

NICHOLAS P. GODICI

*Attesting Officer*    *Acting Director of the United States Patent and Trademark Office*